US010543970B2

(12) United States Patent
Hebert et al.

(10) Patent No.: US 10,543,970 B2
(45) Date of Patent: *Jan. 28, 2020

(54) FLEXIBLE PACKAGING STRUCTURE WITH A BUILT-IN OPENING AND RECLOSE FEATURE

(71) Applicant: Sonoco Development, Inc., Hartsville, SC (US)

(72) Inventors: Robert Charles Hebert, Cockeysville, MD (US); Scott William Huffer, Hartsville, SC (US); Barry Roland Reese, Hartsville, SC (US); John A. Prizzi, Southbury, CT (US)

(73) Assignee: SONOCO DEVELOPMENT, INC., Hartsville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/296,584

(22) Filed: Oct. 18, 2016

(65) Prior Publication Data

US 2017/0036836 A1     Feb. 9, 2017

Related U.S. Application Data

(60) Continuation of application No. 13/542,998, filed on Jul. 6, 2012, now abandoned, which is a continuation
(Continued)

(51) Int. Cl.
*B65D 75/58* (2006.01)
*B65D 75/64* (2006.01)
(Continued)

(52) U.S. Cl.
CPC .......... *B65D 75/5855* (2013.01); *B32B 27/32* (2013.01); *B32B 37/1292* (2013.01);
(Continued)

(58) Field of Classification Search
CPC .............. B65D 77/20; B65D 77/2024; B65D 77/2028; B65D 77/2032; B65D 77/2036;
(Continued)

(56) References Cited

U.S. PATENT DOCUMENTS 3,069,066 A   12/1962   Peckham
3,124,246 A    3/1964   Remer et al.
(Continued)

FOREIGN PATENT DOCUMENTS

EP    0298054 A2    1/1989
EP    0 408 831 A1  1/1991
(Continued)

OTHER PUBLICATIONS

European Search Report for European Application No. 10007352.7, dated Sep. 23, 2010.
(Continued)

*Primary Examiner* — Jes F Pascua
*Assistant Examiner* — Nina K Attel
(74) *Attorney, Agent, or Firm* — Nelson Mullins Riley & Scarborough, LLP

(57) ABSTRACT

A flexible packaging laminate is formed to have a built-in opening and reclose feature by forming the laminate as a two-part structure having an outer structure joined in face-to-face relation with an inner structure. Score lines are formed in both structures to enable an opening to be formed through the laminate by lifting an opening portion (e.g., a flap or the like) of the two structures out of the plane of the laminate. The score line through the outer structure defines a larger opening than the score line through the inner structure, such that a marginal region of the outer structure extends beyond the edge of the opening portion of the inner structure. A pressure-sensitive adhesive is used to re-adhere
(Continued)

the marginal region to an underlying surface of the inner structure adjacent the opening through the laminate.

13 Claims, 4 Drawing Sheets

Related U.S. Application Data of application No. 13/031,469, filed on Feb. 21, 2011, now Pat. No. 8,262,832, which is a division of application No. 12/556,292, filed on Sep. 9, 2009, now Pat. No. 8,262,830, which is a division of application No. 11/098,872, filed on Apr. 5, 2005, now Pat. No. 7,717,620.

(51) Int. Cl.
  *B32B 27/32* (2006.01)
  *B32B 37/12* (2006.01)
  *B32B 38/00* (2006.01)
  *B65D 77/20* (2006.01)

(52) U.S. Cl.
  CPC ...... *B32B 38/0004* (2013.01); *B32B 38/0008* (2013.01); *B65D 75/5838* (2013.01); *B65D 77/2096* (2013.01); *B32B 2553/00* (2013.01); *Y10T 156/1057* (2015.01); *Y10T 156/1059* (2015.01); *Y10T 156/1082* (2015.01); *Y10T 156/1084* (2015.01)

(58) Field of Classification Search
  CPC .............. B65D 77/204; B65D 77/2044; B65D 77/2048; B65D 77/2052; B65D 77/2056; B65D 77/206; B65D 77/2064; B65D 77/2068; B65D 77/2096; B65D 75/58; B65D 75/5827; B65D 75/5838; B65D 75/5844; B65D 75/5833
  USPC ..... 383/200, 203, 207, 208, 210, 210.1, 211
  See application file for complete search history.

(56) References Cited

U.S. PATENT DOCUMENTS

| | | | |
|---|---|---|---|
| 3,185,578 A | 5/1965 | Scharre | |
| 3,193,978 A | 7/1965 | Bader | |
| 3,212,381 A | 10/1965 | Heyer | |
| 3,234,705 A | 2/1966 | Schwartz | |
| 3,874,143 A | 4/1975 | Braber | |
| 3,905,646 A | 9/1975 | Brackmann et al. | |
| 3,909,582 A | 9/1975 | Bowen | |
| 3,982,685 A | 9/1976 | Shimada | |
| 4,185,754 A * | 1/1980 | Julius ............... | A47K 10/421 206/210 |
| 4,260,061 A | 4/1981 | Jacobs | |
| 4,411,365 A | 10/1983 | Horikawa et al. | |
| 4,420,080 A | 12/1983 | Nakamura | |
| 4,468,811 A | 8/1984 | Shaw et al. | |
| 4,549,063 A | 10/1985 | Ang et al. | |
| 4,552,269 A | 11/1985 | Chang | |
| 4,572,377 A | 2/1986 | Beckett | |
| 4,577,761 A | 3/1986 | Nadaskay | |
| 4,586,312 A | 5/1986 | Limousin | |
| 4,610,357 A | 9/1986 | Nakamura | |
| 4,653,250 A | 3/1987 | Nakamura | |
| 4,673,601 A | 6/1987 | Lamping et al. | |
| 4,679,693 A | 7/1987 | Forman | |
| 4,681,781 A | 7/1987 | Murray et al. | |
| 4,693,365 A | 9/1987 | Corella | |
| 4,723,301 A | 2/1988 | Chang | |
| 4,739,879 A | 4/1988 | Nakamura | |
| 4,784,885 A | 11/1988 | Carespodi | |
| 4,790,436 A | 12/1988 | Nakamura | |
| 4,795,271 A | 1/1989 | Lane, Jr. et al. | |
| 4,840,270 A | 6/1989 | Caputo et al. | |
| 4,868,027 A | 9/1989 | Humkeler et al. | |
| 4,874,096 A | 10/1989 | Tessera-Chiesa | |
| 4,923,309 A | 5/1990 | VanErden | |
| 5,060,848 A | 10/1991 | Ewan | |
| 5,065,868 A | 11/1991 | Cornelissen et al. | |
| 5,116,140 A | 5/1992 | Hirashima | |
| 5,124,388 A | 6/1992 | Pruett et al. | |
| 5,158,499 A | 10/1992 | Guckenberger | |
| 5,167,455 A | 12/1992 | Forman | |
| 5,333,735 A | 8/1994 | Focke et al. | |
| 5,464,285 A | 11/1995 | Anderson | |
| 5,531,325 A | 7/1996 | Deflander et al. | |
| 5,535,885 A | 7/1996 | Daniel et al. | |
| 5,613,779 A | 5/1997 | Niwa | |
| 5,630,308 A | 5/1997 | Guckenberger | |
| 5,683,029 A | 11/1997 | Lyons | |
| 5,836,697 A | 11/1998 | Chiesa | |
| 5,855,435 A | 1/1999 | Chiesa | |
| 5,862,101 A | 1/1999 | Haas et al. | |
| 5,908,246 A | 6/1999 | Arimura et al. | |
| 5,938,013 A | 8/1999 | Palumbo et al. | |
| 6,056,141 A | 5/2000 | Navarini et al. | |
| 6,113,271 A | 9/2000 | Scott et al. | |
| 6,120,860 A | 9/2000 | Bowen et al. | |
| 6,126,317 A | 10/2000 | Anderson et al. | |
| 6,296,884 B1 | 10/2001 | Okerlund | |
| 6,309,105 B1 | 10/2001 | Palumbo | |
| 6,383,592 B1 | 5/2002 | Lowry et al. | |
| 6,428,867 B1 | 8/2002 | Scott et al. | |
| 6,450,685 B1 | 9/2002 | Scott | |
| 6,457,585 B1 | 10/2002 | Huffer et al. | |
| 6,517,243 B2 | 2/2003 | Huffer et al. | |
| 6,554,134 B1 | 4/2003 | Guibert | |
| 6,589,622 B1 | 7/2003 | Scott | |
| 6,918,532 B2 | 7/2005 | Sierra-Gomez et al. | |
| 7,007,423 B2 | 3/2006 | Andersson et al. | |
| 7,717,620 B2 | 5/2010 | Hebert et al. | |
| 8,262,830 B2 | 9/2012 | Hebert et al. | |
| 8,262,832 B2 | 9/2012 | Hebert et al. | |
| 8,408,792 B2 | 4/2013 | Cole et al. | |
| 8,545,099 B2 | 10/2013 | Davis et al. | |
| 9,850,056 B2 | 12/2017 | Shaw et al. | |
| 2002/0114541 A1 | 8/2002 | Huffer et al. | |
| 2003/0179955 A1 | 9/2003 | Rehwinkel | |
| 2003/0231811 A1 | 12/2003 | Hodson et al. | |
| 2004/0206637 A1 | 10/2004 | Sierra-Gomez et al. | |
| 2005/0247764 A1 | 11/2005 | Sierra-Gomez et al. | |
| 2005/0247765 A1 | 11/2005 | DeBusk et al. | |
| 2005/0276525 A1 | 12/2005 | Hebert et al. | |
| 2006/0018569 A1 | 1/2006 | Bonenfant | |
| 2006/0171611 A1 | 8/2006 | Rapparini | |
| 2007/0095709 A1 | 5/2007 | Saito et al. | |
| 2007/0095809 A1 | 5/2007 | Lee | |
| 2007/0209959 A1 | 9/2007 | Burgess | |
| 2008/0037911 A1 | 2/2008 | Cole et al. | |
| 2009/0226117 A1 | 9/2009 | Davis et al. | |
| 2010/0018974 A1 | 1/2010 | Lyzenga et al. | |
| 2012/0267386 A1 | 10/2012 | Hebert et al. | |
| 2018/0071974 A1 | 3/2018 | Huffer | |
| 2018/0257294 A1 | 9/2018 | Davis et al. | |

FOREIGN PATENT DOCUMENTS

| | | |
|---|---|---|
| EP | 0 661 154 A1 | 7/1995 |
| EP | 0 905 048 A1 | 3/1999 |
| EP | 0957045 | 11/1999 |
| EP | 0 796 208 | 3/2000 |
| EP | 1 449 789 A1 | 8/2004 |
| EP | 2 243 716 A1 | 10/2010 |
| EP | 2574570 A1 | 4/2013 |
| JP | H05-49622 U | 6/1993 |
| JP | H05-51794 U | 7/1993 |
| JP | H10500378 A | 1/1998 |
| JP | 2000-095282 A | 4/2000 |
| JP | 2008-502555 A | 1/2008 |
| JP | 2011 513153 A | 4/2011 |
| KR | 10-2004-0025490 | 3/2004 |

(56) References Cited

FOREIGN PATENT DOCUMENTS

| WO | WO 95/30599 A1 | 11/1995 |
|----|----------------|---------|
| WO | WO 01/04020 A1 | 1/2001 |
| WO | WO 02/066341 A1 | 8/2002 |
| WO | WO 03/059776 | 7/2003 |
| WO | WO 2010/046623 A2 | 4/2010 |
| WO | WO 2013/114091 A1 | 8/2013 |

OTHER PUBLICATIONS

International Search Report and Written Opinion for corresponding International Application No. PCT/US2005/018614, dated Sep. 16, 2005.
International Preliminary Report on Patentability (Chapter II) from International Application No. PCT/US2005/018614, dated Oct. 6, 2006.
European Search Report for European Application No. 12199183.0, dated Mar. 5, 2013.
Office Action for Japanese Application No. 2013-173126, dated Sep. 29, 2015.
International Search Report and Written Opinion of the International Searching Authority for International Application No. PCT/US2018/046620 dated Nov. 13, 2018.

* cited by examiner

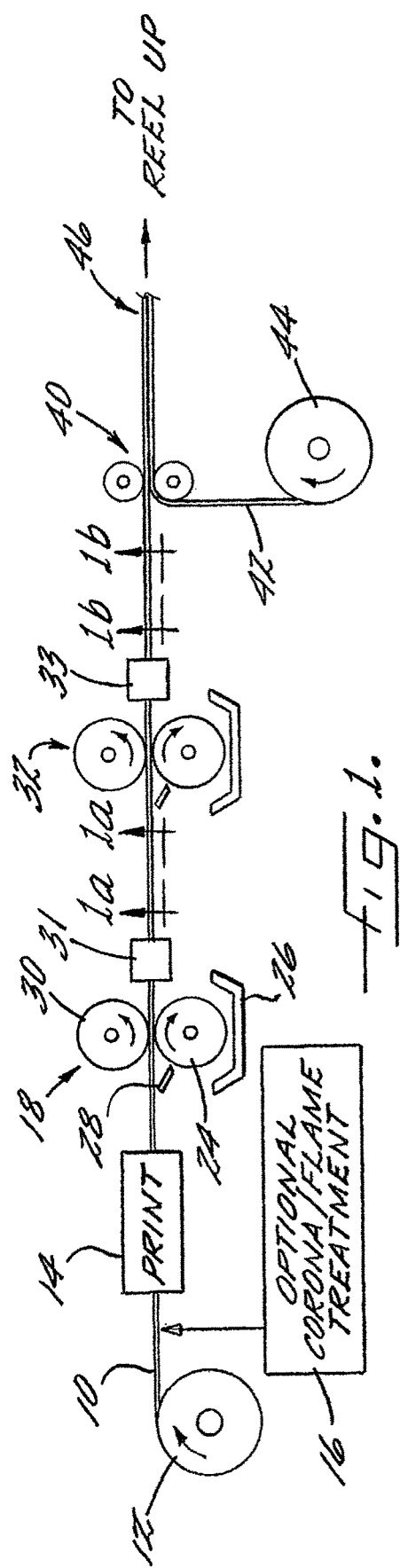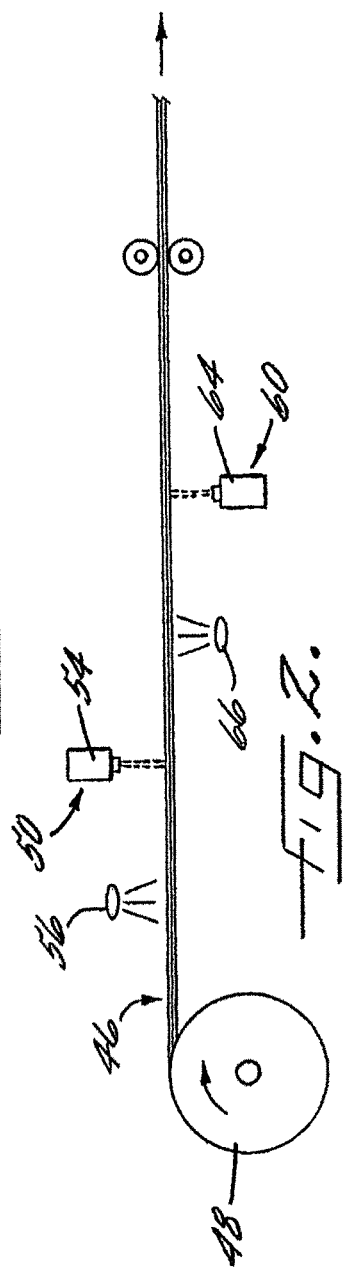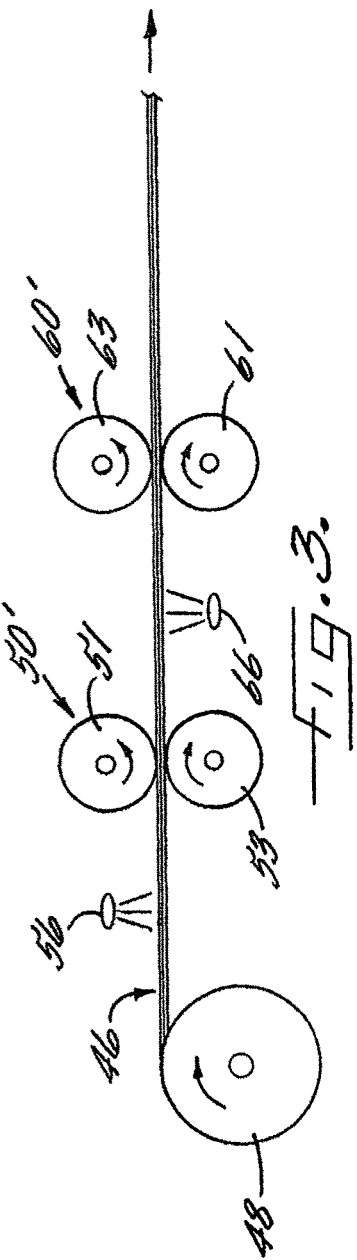

FLEXIBLE PACKAGING STRUCTURE WITH A BUILT-IN OPENING AND RECLOSE FEATURE

CROSS-REFERENCE TO RELATED APPLICATION

This application is a continuation of U.S. application Ser. No. 13/542,998, filed on Jul. 6, 2012, which is a continuation of U.S. application Ser. No. 13/031,469, filed on Feb. 21, 2011, now issued as U.S. Pat. No. 8,262,832, which is a divisional of U.S. application Ser. No. 12/556,292, filed on Sep. 9, 2009, now issued as U.S. Pat. No. 8,262,830, which is a divisional of U.S. application Ser. No. 11/098,872, filed on Apr. 5, 2005, now issued as U.S. Pat. No. 7,717,620. The entire disclosures of each of the above are hereby incorporated herein by reference.

BACKGROUND OF THE INVENTION

This invention relates to flexible packaging for products, and particularly relates to methods for making such packaging that is reclosable after initial opening.

A variety of food and non-food products are packaged using flexible packaging materials formed primarily of laminations of one or more of polymer films, metallized polymer films, paper, metal foil, and the like. In many instances, packages contain products that may be used or consumed a little at a time, and the products may be susceptible to being adversely affected (e.g., becoming soggy, drying out, etc.) by exposure to the surrounding environment. Accordingly, there is frequently a desire to be able to reclose a package after its initial opening to keep product that remains in the package fresh.

Various opening and reclose arrangements have been developed for flexible packaging. Often, reclosability is achieved by using a pressure-sensitive adhesive label that is attached to the exterior of the package adjacent the location where the package is opened. Such labels are formed separately from the packaging structure itself and are added to the packaging structure. The labels thus represent additional expense. Furthermore, it is often necessary to ship a roll of the packaging material to a converter for application of the labels, after which the roll is shipped back to the packager for manufacture of the packages. This manufacturing process is inefficient. The use of labels also entails waste in that it is typically necessary to employ a release liner with the labels, which liner is removed and discarded. The labels are usually die cut from a web of material, and the skeleton left over after the die-cutting operation is also wasted.

BRIEF SUMMARY OF THE INVENTION

The present invention addresses the above needs and achieves other advantages, by providing a flexible packaging structure and method for making same, in which the structure has a built-in opening and reclose feature that does not require a separate label. In accordance with one aspect of the invention, a flexible packaging structure is formed to have a built-in opening and reclose feature by forming the packaging structure as a two-part structure, having an outer structure joined in face-to-face relation with an inner structure. Each of the outer and inner structures can comprise one or more layers of flexible packaging material such as polymer film, paper, metal foil, and the like. An outer line of weakness is formed in the outer structure to define an outer opening portion that can be lifted out of the plane of the outer structure. Similarly, an inner line of weakness is formed in the inner structure to define an inner opening portion that can be lifted out of the plane of the inner structure. The outer and inner opening portions are attached to each other such that the outer and inner opening portions can be lifted out of the plane as a unit, thereby creating an opening through the packaging structure defined by the inner line of weakness.

The outer opening portion is larger in area than the inner opening portion and has a marginal region that extends beyond the peripheral edge of the inner opening portion. When the outer and inner opening portions are lifted out of the plane to create the opening, an underlying portion of the inner structure in registration with the marginal region of the outer opening portion is exposed adjacent the opening. A pressure-sensitive adhesive is applied to either the marginal region of the outer opening portion or the underlying portion of the inner structure. Therefore, after initial lifting of the outer and inner opening portions, the opening through the structure can be reclosed by adhering the marginal region of the outer opening portion to the underlying portion of the inner structure via the pressure-sensitive adhesive.

In accordance with one embodiment of the invention, the pressure-sensitive adhesive is onto one surface of the outer structure, the pressure-sensitive adhesive forming a strip having an outer perimeter and an inner perimeter, and a permanent laminating adhesive is pattern-applied onto the one surface of the outer structure such that the permanent adhesive does not cover the strip of pressure-sensitive adhesive. Next, the outer structure is adhesively joined to the inner structure via the permanent adhesive so as to form a laminate. The outer structure and inner structure in preferred embodiments are coextensive with each other, and advantageously are each continuous webs drawn from respective supply rolls and laminated together to form a laminate that is a continuous web.

The laminate is then advanced to a scoring station at which an outer line of weakness (also referred to herein as a "score line") is formed through the thickness of the outer structure, and an inner score line is formed through the thickness of the inner structure. Advantageously, each of the score lines is registered with respect to the strip of pressure-sensitive adhesive such that neither score line is located where there is permanent laminating adhesive between the outer and inner structures. The outer score line delineates the outer opening portion of the outer structure that is separable from the outer structure along the outer score line, and the inner score line delineates the inner opening portion of the inner structure that is affixed to the outer opening portion by the permanent adhesive and is separable from the inner structure along the inner score line.

It is also within the scope of the invention to use only pressure-sensitive adhesive, with no permanent laminating adhesive. In this case, the pressure-sensitive adhesive serves to join the outer structure to the inner structure over their entire surfaces.

The score lines can be formed by laser scoring or by mechanical scoring or cutting such as by die cutting or kiss cutting or the like. The adhesive(s) can be applied to the outer structure as noted, but alternatively can be applied to the inner structure. The adhesive(s) can be applied using any suitable equipment and technique, such as by a gravure roll or the like.

The pressure-sensitive adhesive can be applied such that there is a region that is free of the adhesive to form a thumb tab or grasping portion of the opening portion that can be readily grasped and pulled back to initiate opening.

The outer line of weakness or score line preferably penetrates through the thickness of the outer structure but not through the inner structure. Similarly, the inner score line preferably penetrates through the thickness of the inner structure but not through the outer structure.

The inner structure of the laminate advantageously includes a sealant layer forming the inner surface of the laminate. The sealant layer can comprise a heat seal material such as polyethylene, polypropylene, ionomer resin such as SURLYN®, or the like, or a cold seal material. The heat seal or cold seal layer can comprise either a film or a coating. The inner structure advantageously also includes a barrier layer providing a barrier against the passage of moisture and/or oxygen. In some applications such as the packaging of moisture-sensitive products (e.g., cookies or similar products that tend to be degraded when exposed to the environment), it is important to provide a moisture barrier. The barrier layer can comprise any of various polymer-based barrier materials including barrier polymer films such as ethylene vinyl alcohol copolymer (EVOH), polyamide, and the like; metallized polyolefin films such as polyethylene, polypropylene, oriented polypropylene, and the like; AlOx-coated polymer films; SiOx-coated polymer films; metal foil such as aluminum foil; and others. Although the term "barrier layer" is used in connection with metallized films to refer to the entire metallized film, it will be recognized that it is the layer of metal that provides the barrier function. Likewise, it is the AlOx or SiOx coating that provides the barrier function in the ceramic-coated films, but the entire film nevertheless is referred to herein as a "barrier layer".

The outer structure advantageously includes a layer of polyester such as polyethylene terephthalate, which has a desirable crisp feel and is readily printed. The polyester layer can be printed with inks to provide graphics and indicia. In preferred embodiments, the polyester layer is transparent and is reverse-printed on the surface that faces the inner structure.

The process in accordance with the invention comprises an in-line process wherein the opening and reclose features are formed in the packaging laminate during the production of the laminate. Accordingly, it is not necessary to ship the laminate to a converter for application of labels or the like. Thus, the waste and the various material and shipping expenses associated with the use of separate labels are avoided.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a diagrammatic depiction of a first phase of a manufacturing method for making a flexible packaging structure in accordance with one embodiment of the invention;

FIG. 2 is a diagrammatic depiction of a second phase of the method in accordance with one embodiment of the invention;

FIG. 3 is a diagrammatic depiction of a second phase of the method in accordance with another embodiment of the invention;

DETAILED DESCRIPTION OF THE INVENTION

Figure 1A:
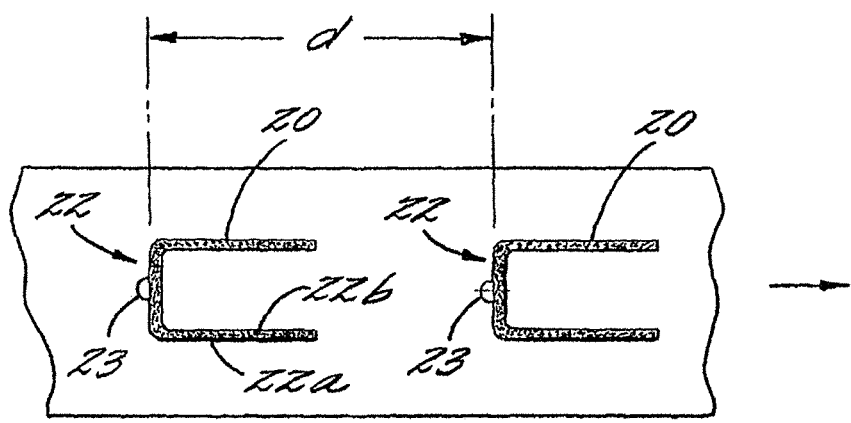
FIG. 1a is a view of the first structure along line 1a-1a in FIG. 1.

The present inventions now will be described more fully hereinafter with reference to the accompanying drawings, in which some but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As an initial overview of preferred embodiments of the invention, a flexible packaging laminate is constructed to have a built-in opening and reclose function. The laminate is constructed as a multi-layer structure by adhesively laminating a first structure to a second structure, wherein each of the first and second structures comprises one or more layers of flexible material(s). Permanent and pressure-sensitive adhesives are applied to one of the structures in predetermined patterns. Once the laminate is formed in this manner, scoring operations are performed on both sides of the laminate in registration with the adhesive patterns, but each scoring operation penetrates only through a part of the thickness of the laminate; in particular, a scoring operation performed on the side of the laminate adjacent the first structure results in penetration through the first structure, but without complete penetration through the second structure, and preferably without any substantial penetration, and more preferably without any penetration, into the second structure. Likewise, the scoring operation performed on the side of the laminate adjacent the second structure results in penetration through the second structure, but without complete penetration through the first structure, and preferably without any substantial penetration, and more preferably without any penetration, into the first structure.

More particularly, with reference to FIG. 1, a first phase of the manufacturing process is depicted. A first structure 10 is advanced from a supply roll 12 by suitable web driving and handling equipment (not shown) to an optional print station 14 comprising a printing apparatus, such as a rotogravure printer or the like, for printing graphics and/or indicia on the first structure by applying inks to a surface of the first structure. The first structure 10 comprises one or more layers of flexible packaging material. Various materials can be used for the layer(s) of the first structure, including polymers such polyesters, polyolefins (including homopolymers and copolymers), polyamides, and others; paper; metal foil; and the like. In a preferred embodiment of the invention, the first structure 10 includes an outer layer that is substantially transparent and is reverse-printed in the print station 14, i.e., the inks are applied to the surface of the first structure 10 that is subsequently laminated to another structure, as described below; from the opposite side of the first structure, which will form an exterior of a package constructed from the packaging laminate, the inks are visible through the first structure. As an example, the first structure 10 can comprise a layer of polyester such as polyethylene terephthalate or the like.

Prior to printing the first structure in the print station, the surface of the first structure that is subsequently laminated to the other structure can be treated by a corona discharge or flame treatment apparatus 16 to render the surface more-receptive to the inks and/or to render the surface more-readily bondable to the pressure-sensitive adhesive that is subsequently pattern-applied to the surface as described below. Alternatively, the first structure 10 can have already been so treated prior to being wound into the supply roll 12, such that the treatment apparatus 16 is unnecessary.

Figure 1B:
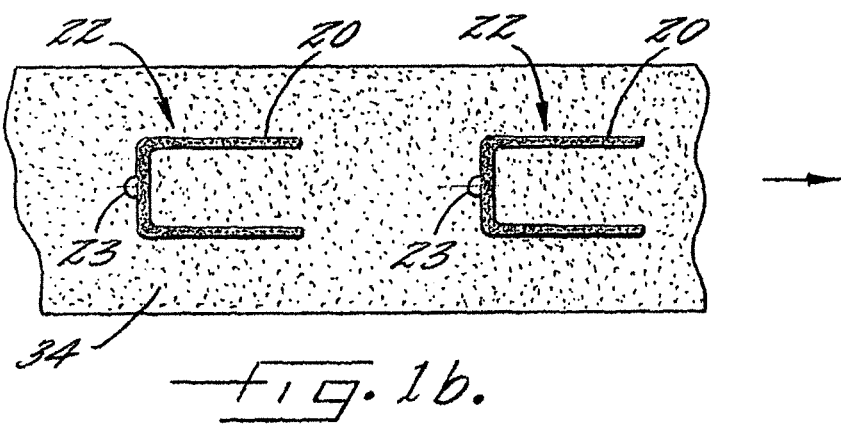
FIG. 1b is a view of the first structure along line 1b-1b in FIG. 1.

Following the optional corona/flame treatment and/or optional printing operation, and with reference to FIGS. 1 and 1a, the first structure 10 is advanced to a first adhesive application station 18 at which a pressure-sensitive adhesive 20 is applied to the first structure in a predetermined pattern 22 that recurs at regular intervals along the lengthwise direction of the first structure. The predetermined pattern 22 is generally in the form of a strip of various forms or shapes. As illustrated, a preferred shape for the strip pattern 22 is generally U-shaped, for reasons that will become apparent in the description of FIGS. 4-8; however, other shapes for the pattern 22 can be used, the invention not being limited to any particular pattern. The pattern can include a region 23 that is free of adhesive and will ultimately form a thumb tab or grasping portion of the first structure 10 as further described below.

The pressure-sensitive adhesive 20 can comprise various compositions. Pressure-sensitive adhesives form viscoelastic bonds that are aggressively and permanently tacky, adhere without the need of more than a finger or hand pressure, and require no activation by water, solvent or heat. Pressure-sensitive adhesives are often based on non-cross-linked rubber adhesives in a latex emulsion or solvent-borne form, or can comprise acrylic and methacrylate adhesives, styrene copolymers (SIS/SBS), and silicones. Acrylic adhesives are known for excellent environmental resistance and fast-setting time when compared with other resin systems. Acrylic pressure-sensitive adhesives often use an acrylate system. Natural rubber, synthetic rubber or elastomer sealants and adhesives can be based on a variety of systems such as silicone, polyurethane, chloroprene, butyl, polybutadiene, isoprene, or neoprene. When the packaging laminate of the invention is to be used for food packaging, the pressure-sensitive adhesive generally must be a food-grade composition. Various pressure-sensitive adhesives are approved by the U.S. Food and Drug Administration for use in direct food contact, as regulated by 21 CFR Part 175.300. A preferred food-grade pressure-sensitive adhesive for use in the present invention is Jonbond 743 available from Bostik Findley. Additives (e.g., particulates or the like) can be added to the pressure-sensitive adhesive to reduce the tenacity of the bond to the underlying second structure 42, if necessary, so that the pressure-sensitive adhesive readily detaches from the second structure on opening (particularly on the very first opening).

The pattern 22 of pressure-sensitive adhesive, as noted, is applied to the first structure 10 at regular intervals along the first structure. The spacing or index distance d between the patterns 22 can correspond to a dimension, such as a length, of packages to be produced from the packaging laminate.

The adhesive application station 18 can comprise any suitable device capable of accurately applying the pressure-sensitive adhesive to the first structure in the desired pattern 22, at regular intervals along the structure. For example, as shown, the adhesive application station can comprise a gravure roll 24 that picks up the pressure-sensitive adhesive from a reservoir 26 on the outer surface of the roll such that the adhesive fills one or more recessed areas in the surface. A doctor blade 28 scrapes off excess adhesive so that it remains essentially only in the recessed area(s). The first structure 10 is contacted by the gravure roll; a backing roll 30 provides support on the opposite side of the first structure.

After application of the pressure-sensitive adhesive, the first structure is advanced to a dryer 31 such as an oven or the like, to dry the pressure-sensitive adhesive. The first structure is then advanced to a second adhesive application station 32 at which a permanent laminating adhesive 34 (FIG. 1b) is applied to the first structure in such a manner that a sufficiently large proportion of the surface is covered by the permanent adhesive to permit the first structure to be adhesively attached to a second structure at a downstream laminating station 40. The permanent adhesive 34 does not cover the pressure-sensitive adhesive 20. Furthermore, when the pattern of pressure-sensitive adhesive includes an adhesive-free region 23 to form a thumb tab or grasping portion as previously noted, the pattern of the permanent adhesive also does not cover the adhesive-free region 23. Thus, the permanent adhesive must be applied by an apparatus capable of accurately applying the adhesive in a predetermined pattern, in registration with the pressure-sensitive adhesive but not covering it or the adhesive-free region if present. A suitable adhesive application device 32, as shown, can be a gravure roll of the type previously described.

The permanent adhesive 34 can comprise various compositions. Suitable examples include two-component polyurethane adhesive systems, such as Tycel 7900/7283 available from Henkel.

As noted, after the application of the permanent adhesive, the first structure is advanced to a dryer 33 such as an oven or the like. The first structure is then advanced to a laminating station 40, comprising a pair of rolls forming a nip therebetween. The first structure 10 is passed through the nip along with a second structure 42 that is advanced from its own supply roll 44, and the first and second structures are laminated to each other. The second structure comprises one or more layers of flexible material, and is coextensive with the first structure—i.e., the width of the second structure is substantially equal to the width of the first structure and the longitudinal edges of the second structure substantially coincide with the longitudinal edges of the first structure. The resulting laminate 46 is then advanced to a reel-up (not shown) where it is wound into a roll for subsequent processing in the second phase of the manufacturing process as described below. Alternatively, it is possible for the reel-up operation to be omitted, such that the laminate is directly advanced to the second phase.

Figure 6:
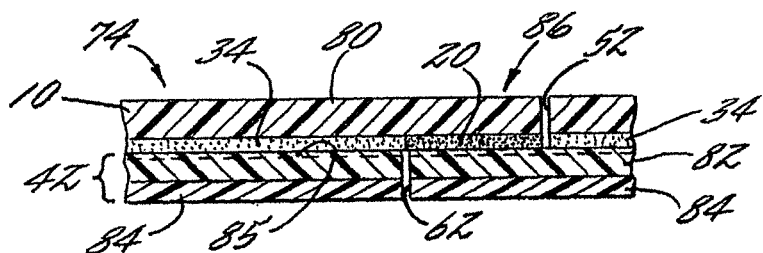
FIG. 6 is a cross-sectional view along line 6-6 in FIG. 4.

With reference to FIGS. 2 and 6, the second phase of the process is now described. A supply roll 48 of the laminate 46 formed in the first phase of the process is shown. The laminate is advanced from the supply roll to a first scoring station 50 at which a first score line 52 (FIG. 6) is formed through the thickness of the first structure 10. The first score line 52 is in registration with (i.e., coincides with) the outer perimeter 22a (FIG. 1a) of the strip-shaped pattern 22 of pressure-sensitive adhesive 20. The first score line 52 extends substantially through the thickness of the first structure 10, but preferably does not extend to any substantial extent into the second structure 42, as illustrated in FIG. 6.

The first scoring station 50 can comprise a laser 54 as depicted in FIG. 2. The use of lasers for scoring through flexible materials is generally known, for example as described in U.S. Pat. No. 5,158,499, incorporated herein by reference. The depth of the score line formed by the laser can be regulated by regulating the power output or beam intensity of the laser beam, the width or spot size of the laser beam, and the amount of time a given spot on the film surface is irradiated by the beam. These factors generally are selected based on the characteristics of the material being scored. Some materials are more readily scored by lasers than other materials, as known in the art.

As noted, the first score line 52 must be in registration with the outer perimeter 22a of the pressure-sensitive adhesive strip (and the outer perimeter of the thumb tab 23, if present). To accomplish this registration, the operation of the laser 54 is controlled to be synchronized with the advancement of the laminate 46. A sensor 56 disposed adjacent the laminate 46 can be used for detecting a feature on the laminate whose location in relation to the strip of pressure-sensitive adhesive is known, and the sensor's output signal can be used by a suitable controller (not shown) for controlling the laser 54.

Next, the laminate is advanced to a second scoring station 60 at which a second score line 62 (FIG. 6) is formed through the thickness of the second structure 42. The second score line 62 is in registration with (i.e., coincides with) the inner perimeter 22b (FIG. 1a) of the strip-shaped pattern 22 of pressure-sensitive adhesive 20. The second score line 62 extends substantially through the thickness of the second structure 42, but preferably does not extend to any substantial extent into the first structure 10, as illustrated in FIG. 6.

The second scoring station 60 can comprise a laser 64. The operation of the laser 64 is synchronized with the advancement of the laminate in a manner as described above. A sensor 66 can detect a feature, such as an eye mark, on the laminate whose location in relation to the pressure-sensitive adhesive strip is known, and the sensor output can be used for regulating the laser operation so that the second score line is in registration with the inner perimeter of the pressure-sensitive adhesive strip.

As an alternative to the use of lasers for scoring the laminate, the score lines 52, 62 can be formed in the laminate by mechanical scoring or cutting. For instance, as depicted in FIG. 3, a first scoring station 50' can comprise a kiss roll 51 and backing roll 53 that form a nip through which the laminate is passed. The kiss roll 51 comprises a rotary cutting die defining a cutting edge (not shown). The kiss roll acts in conjunction with the backing roll to cut partially through the thickness of the laminate starting from the outer surface of the first structure 10, such that the first structure is substantially scored through while the second structure is left intact. The second scoring station 60' likewise comprises a kiss roll 61 and backing roll 63 for scoring through the second structure 42.

Additionally, it is within the scope of the invention to laser-score one side of the laminate and to kiss cut or otherwise mechanically score the other side. This can be advantageous, for example, when one of the structures making up the laminate is readily scored by a laser but the other structure is not. For instance, when the first structure 10 is a polyester such as PET, it can readily be scored with a laser, but if a polyethylene heat seal layer is employed on the opposite side, laser scoring may not be the best choice because polyethylene does not score well with a laser. In this case, kiss cutting or other mechanical scoring can be used to score the inner structure 42.

After the scoring operations, the laminate 46 can be sent to a reel-up (not shown) and wound into a roll for subsequent processing. The laminate can also be slit into a plurality of partial widths and wound into multiple rolls. In this latter instance, each partial width would have the recurring patterns of pressure-sensitive and permanent adhesives applied with suitably configured adhesive applicators to the full-width material, and would have the recurring score lines formed by suitably configured scoring devices acting on either the full-width laminate prior to slitting or acting on each partial-width portion after slitting.

An advantage of the invention, versus the formation of a web having discrete labels applied to a partial portion of the web surface as in the prior art, is that the laminate has a uniform thickness throughout (because the first and second structures are coextensive) and therefore winds well into good-quality rolls. In contrast, a web with labels centrally located in the width of the web tends to produce wound rolls that are soft in the radial direction at the two ends of the roll where the labels are not present. Additionally, the web with labels is much thicker than laminates made in accordance with the invention, and hence the laminates of the invention can achieve a greater square footage per roll of a given diameter. As already noted, a further drawback to the use of labels is the necessity of applying the labels to the web in an "off-line" process, which often entails shipping a roll of the web to a converter that applies the labels and then ships the roll back to the package manufacturer. In the process of the invention, the manufacture of the laminate and the incorporation of the opening and reclose features in the laminate are conducted in an in-line fashion as part of the same overall process. The process of the invention thus is much more efficient and less costly.

Additionally, the invention avoids other drawbacks associated with the use of labels. More specifically, pressure-sensitive adhesive labels typically require a release liner that is peeled off and thrown away, which represents waste. Furthermore, there is the additional waste of the skeleton material left over after die-cutting the labels from the label web material. The present invention eliminates such waste and attendant costs.

Figure 4:
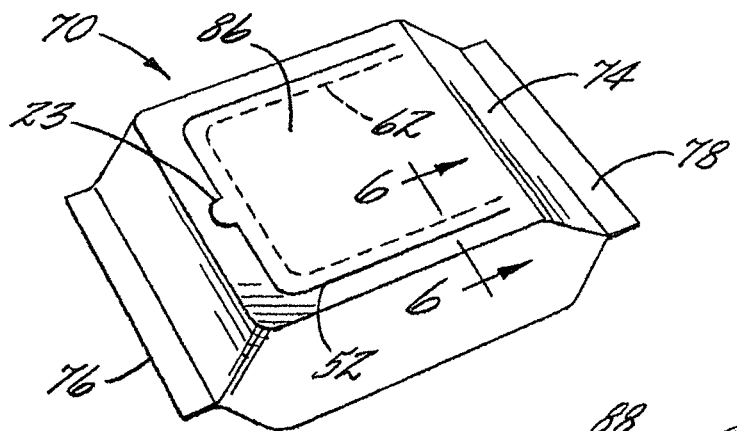
FIG. 4 is a perspective view of a package that can be formed from a flexible packaging structure made in accordance with the method of the invention.
Figure 5:
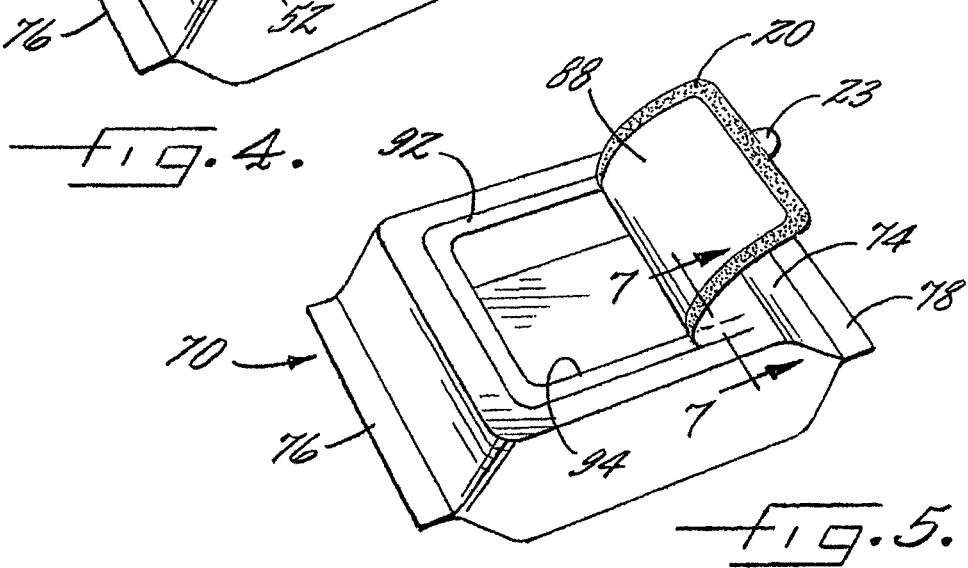
FIG. 5 shows the package of FIG. 4 after being opened.

Some possible applications for the resulting laminate are now explained with reference to FIGS. 4-9. FIGS. 4 and 5 show a flexible package 70. The package includes an outer wrapper 74 that envelopes the package contents and is sealed to enclose the contents. The outer wrapper 74 comprises a packaging laminate made by a method in accordance with the invention, such as the laminate 46 previously described. The outer wrapper is manipulated into a tubular shape and the longitudinal edges of the wrapper are sealed together by a suitable sealant material to form a longitudinal seal (not shown), typically adjacent the bottom surface of the package. The opposing portions of the wrapper are sealed together along transverse seal lines 76, 78 adjacent the opposite ends of the tubular wrapper. The ends of the wrapper can be gusseted if desired, as known in the art.

In the illustrated package, the portion of the outer wrapper 74 having the score lines 52, 62 is provided to be on the top surface of the package. The area of the wrapper bounded by the score lines can constitute any fraction of the total top surface of the package, but advantageously the area is a majority of the total surface area of the top surface.

Based on the previous description of the laminate 46 and its formation process, it will be appreciated that the presence of the score lines 52, 62 has little or no impact on the barrier function of the outer wrapper because each score line extends only partially through the total thickness of the wrapper and the score lines are not aligned with each other. Additionally, the pressure-sensitive adhesive 20 fills the space between the score lines so that even if the score lines overlap somewhat in the thickness direction, there is still no open route between them. Furthermore, the score lines typically have a small width, on the order of a few thousandths of an inch.

Various materials can be used for the construction of the outer wrapper 74. With reference to FIG. 6, in the illustrated embodiment, the first structure 10 that forms the outer surface of the wrapper comprises a single layer 80 of flexible material. The layer 80 can comprise various materials. A preferred material is a polyester such as polyethylene terephthalate (PET). As noted, the PET layer can be reverse-printed if desired, although alternatively it can be printed on its exterior and covered by an over-lacquer (not shown). The second structure 42 forming the inner surface of the wrapper comprises a barrier layer 82 and a sealant layer 84. The sealant layer 84 constitutes the innermost surface of the wrapper, and can comprise various sealant materials such as heat seals or cold seals. Heat seals generally are preferred because they provide stronger seals than cold seals typically are capable of achieving. Any suitable heat seal materials can be employed, such as polyethylene, polypropylene, ionomer resins such as SURLYN®, or others.

The barrier layer 82 can comprise any of various barrier materials including barrier polymer films such as: ethylene vinyl alcohol copolymer (EVOH), polyamide, and the like; metallized polyolefin films such as polyethylene, polypropylene, oriented polypropylene, and the like; AlOx-coated polymer films; SiOx-coated polymer films; metal foil; and others.

The barrier layer 82 and sealant layer 84 can be joined in various ways, including adhesive lamination, extrusion lamination, or coextrusion.

Advantageously, the laminate includes a metallization layer or a metal foil layer between the first structure 10 and the second structure 42, for example by providing a metallization layer 85 on the surface of the layer 82 that faces the first structure 10. This is beneficial in enhancing the barrier performance of the laminate as already noted. Additionally, however, the metallization layer or metal foil layer can also be helpful when a laser is used for scoring the second structure 42. In particular, when the sealant layer 84 comprises polyethylene, which is not as readily scored by laser as some other materials such as polyester, it can be difficult to employ a sufficiently high laser energy to score through the polyethylene sealant layer without scoring through the laminate more deeply than desired. In some cases, the entire thickness of the laminate may be scored through, which is undesirable. The metallization layer or metal foil layer can be helpful in "tuning" the laser to penetrate only up to the metallization layer or foil layer.

The function of the opening and reclose feature provided by the pattern-applied adhesives and the score lines will now be described. With reference to FIGS. 4 and 6, the package 70 is shown in a closed condition, for example as initially filled and sealed in a packaging plant. On the top surface of the outer wrapper 74, the first or outer structure 10 is adhesively joined to the second or inner structure 42 via the permanent adhesive 34. The outer score line 52 bounds an outer opening portion 86 of the outer structure 10. In this embodiment, the outer opening portion 86 has a generally U-shaped perimeter having three sides defined by the score line 52, and is attached to the remainder of the outer wrapper along a fourth side (i.e., an imaginary line extending between the free ends of the two legs of the U-shaped score line 52). The inner score line 62 is also generally U-shaped and parallel to the outer score line, but is spaced inwardly of the outer score line so as to define an inner opening portion 88 of smaller area than the outer opening portion 86. Accordingly, there is a marginal region 90 of the outer opening portion 86 that extends beyond the edge of the inner opening portion 88. The pressure-sensitive adhesive 20 is disposed between this marginal region 90 and an underlying surface 92 of the inner structure 42. The outer opening portion 86 and inner opening portion 88 are permanently joined by the permanent adhesive 34.

Consequently, when the outer opening portion 86 is detached from the outer wrapper along the outer score line 52 and is peeled back as in FIG. 5, the inner opening portion 88 remains affixed to the outer opening portion and comes with it, thereby creating an opening 94 in the top surface of the outer wrapper 74 as defined by the inner score line 62. The outer and inner opening portions essentially form a flap that remains attached along a hinge line defined between the free ends of the two legs of the U-shaped score lines.

Figure 7:
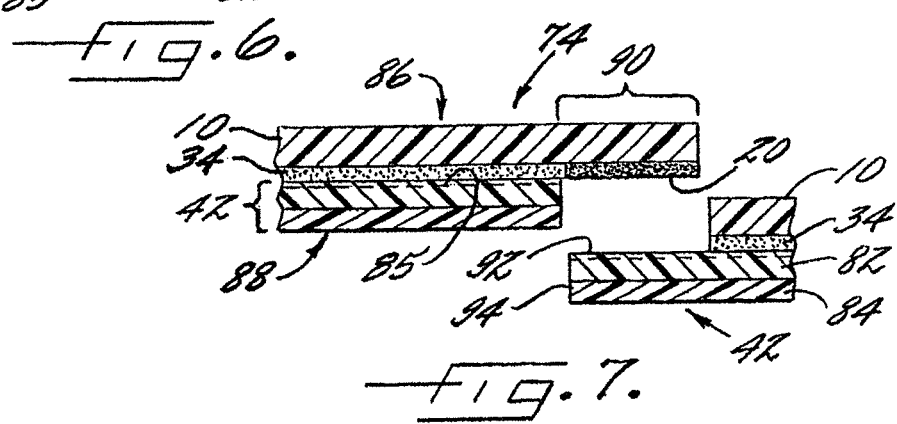
FIG. 7 is a cross-sectional view along line 7-7 in FIG. 5.

The outer structure 10 preferably has a greater affinity for bonding with the pressure-sensitive adhesive 20 than does the surface 92 of the inner structure 42, and hence the pressure-sensitive adhesive 20 is detached from the surface 92 and remains attached to the marginal region 90 of the outer opening portion 86 as shown in FIGS. 5 and 7. The package is reclosable by re-attaching the pressure-sensitive adhesive 20 to the surface 92 of the inner structure 42 to restore the package to the condition shown in FIG. 6.

The greater bonding affinity of the outer structure 10 can be achieved in various ways. When the outer structure comprises a layer of PET and the layer 82 of the inner structure to which the pressure-sensitive adhesive is attached comprises a polyolefin such as polypropylene, oriented polypropylene, or metallized oriented polypropylene, the PET will naturally have a greater affinity for bonding to the adhesive than will the polyolefin layer. Additionally or alternatively, the surface of the outer structure 10 can be treated, as previously noted, by corona discharge or flame treatment, to increase the surface energy and enhance the bonding affinity. It is also possible, as already noted, to control the bond strength of the pressure-sensitive adhesive to the layer 82 by including an additive in the adhesive to reduce the bond strength, if desired.

Although it is preferred to have the pressure-sensitive adhesive be applied to the outer structure and to remain on the outer structure upon opening, it is also within the scope of the invention to apply the pressure-sensitive adhesive to the inner structure and to remain on the inner structure upon opening. This is less preferred, however, because of the greater tendency for crumbs or the like from the contained products to become adhered to the pressure-sensitive adhesive and thereby reduce its adhesiveness with repeated openings and reclosings. It is believed that this tendency is reduced when the pressure-sensitive adhesive remains with the outer structure, since it is out of the way of the package opening when products are being removed.

It will be appreciated from the above description that laminates made in accordance with the invention inherently provide a tamper-evidence function for a package because after opening it is very difficult or impossible to replace the opening portions 86, 88 in such a way as to achieve a completely smooth, flush condition with the surrounding portion of the laminate. It tends to be readily ascertainable that the package has been opened. When printing is included on the laminate, it is even more noticeable when the package has been opened because it is difficult to achieve perfect registration of the printed matter across the score line when reclosing the package.

Additionally, other tamper-evidence features can be incorporated into the packaging structure. For example, when the outer structure is reverse-printed with ink, an area on the marginal region of the outer opening portion can first be treated (such as by applying a release coating or the like) to reduce the adherence of the ink so that when the package is first opened, the ink on the area of the marginal region detaches from the marginal region of the outer opening portion and remains with the pressure-sensitive adhesive on the inner structure adjacent the package opening. The release coating can be applied in a pattern (e.g., spelling out a word such as "Opened" or the like). Other types of tamper-evidence features can be included.

Figure 8:
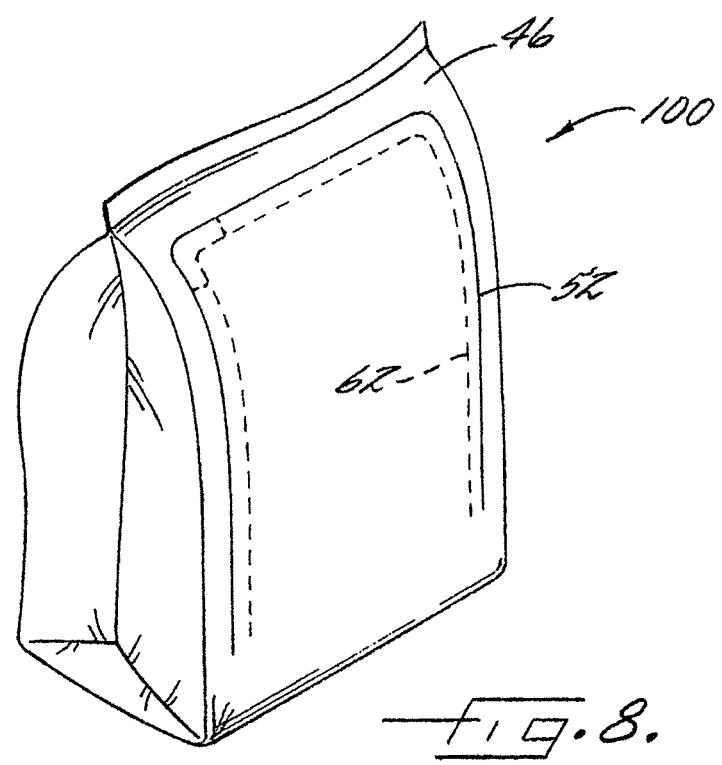
FIG. 8 is a perspective view of another type of package that can be formed from a flexible packaging structure made in accordance with the method of the invention.

The laminates made in accordance with the invention can be used for forming other types of packages such as stand-up pouches or pillow packages. For instance, FIG. 8 shows a stand-up pouch 100 constructed from the laminate 46 as described above. The outer score line 52 and inner score line 62 are formed in a side wall of the pouch. The opening and reclose feature operates in a manner similar to that described above. An alternative form of thumb "tab" 23' is included, wherein a corner portion of the outer flap delineated by the outer score line 52 is left free of pressure-sensitive adhesive.

It should be noted that the terms "line of weakness" and "score line" as used herein refer either to a complete cutting through of one or more layers of the laminate or to a weakening of such layer(s) allowing the layer(s) to be severed along the score line.

Figure 9:
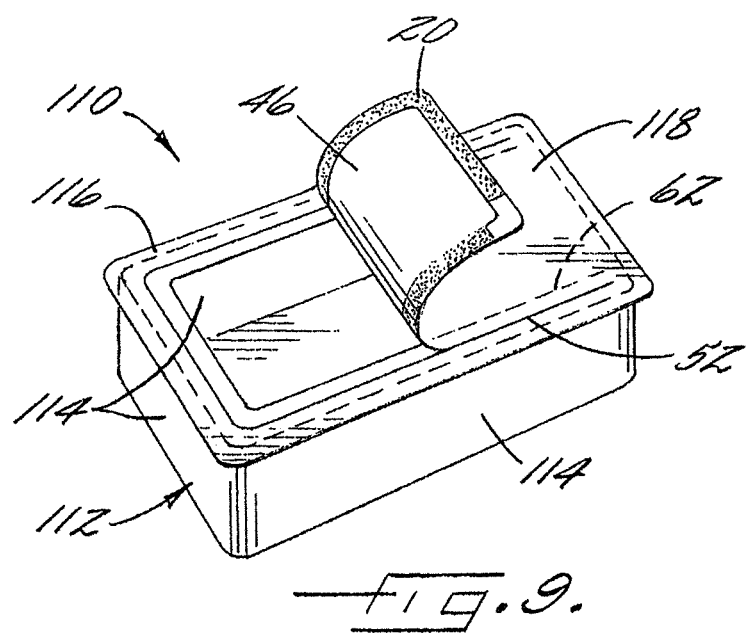
FIG. 9 shows yet another type of package in accordance with the invention.

The packages described above are formed by completely enveloping the contents in the flexible laminate. Alternatively, however, it is within the scope of the invention to employ the flexible laminate as a lidding stock for forming flexible lids that can be secured (e.g., by heat-sealing or the like) to a flange of a tray or other container that contains the contents. In this manner, the lid includes a built-in opening and reclose feature as previously described. For instance, FIG. 9 shows a package 110 comprising a container body 112 having a side wall 114 and a flange 116 extending from the upper edge of the side wall. The container body 112 can comprise various materials (e.g., polymer, paper, foil, etc.) and can be formed by various methods (e.g., thermoforming, molding, etc.). The open top of the container body is closed by a lid 118 formed of a flexible laminate 46 in accordance with the invention. The lid is sealed to the flange 116 by any suitable technique, such that the lid is firmly attached to the flange. The lid includes an opening and reclose feature formed by an inner score line 62 and an outer score line 52 and pressure-sensitive adhesive 20, as previously described. The package 110 also includes a thumb "tab" 23' generally as described in connection with FIG. 8; alternatively, a thumb tab of the type shown in FIGS. 4 and 5 can be used.

Example

A polyethylene terephthalate (PET) film was printed in a rotogravure press with a layer of red ink, and then was printed with a layer of white ink over the red ink, the ink layers covering one entire side of the film. Next, the ink side of the film was printed with a pressure-sensitive adhesive in a U-shaped pattern. The adhesive comprised a water-based acrylic formulation. Finally, a permanent solvent-based urethane adhesive was pattern-applied to the film outside of the U-shaped pattern. A 1-mil thick metallized oriented polypropylene film was laminated in-line to the PET film to form a 2-ply structure. A number of such laminates were produced. After two days of cure time, one of the laminate samples was laser-scored on the top (outer) and bottom (inner) plies generally as previously described; one sample was laser-scored on the top ply and mechanically die-cut on the bottom ply; a third sample was die-cut on both top and bottom plies. The samples were tested to assess their opening and resealing performance.

The sample having both top and bottom layers laser-scored had a maximum peel force to open the flap of 850 grams. By comparison, the sample that was laser-scored on top and die-cut on bottom had a peel force of 789 grams. The sample that was die-cut on top and bottom had a peel force of 815 grams. All samples had acceptable reseal performance.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A resealable packaging structure for housing products wherein the entire packaging structure comprises a laminate comprising an outer layer and an inner layer that are coextensive across substantially their entire areas, each of the layers having an upper surface and a lower surface and wherein, other than in an unadhered tab portion of the outer layer, the outer layer lower surface is adhered to the inner layer upper surface over substantially their entire surfaces, the laminate further comprising a repeatedly openable and closeable flexible structure which comprises:
   a) a permanently adhered portion and a releasably adhered portion;
   b) a first opening in the laminate defined by an outer layer opening portion and a second opening in the laminate defined by an inner layer opening portion wherein the outer layer opening portion is larger in area than the inner layer opening portion and extends beyond a periphery of the inner layer opening portion, and wherein the outer layer opening portion comprises the tab portion;
   c) a non-detachable flap having a releasable perimeter that is resealable to the inner layer upper surface, the flap comprising the outer layer opening portion and the inner layer opening portion and wherein the inner layer opening portion of the flap has dimensions at least equal to the dimensions of the second laminate opening and wherein the outer layer opening portion of the flap has dimensions at least equal to the dimensions of the first laminate opening;
   d) the inner layer upper surface comprising a first marginal region in the releasably adhered portion of the laminate and surrounding the second laminate opening;
   e) the outer layer lower surface comprising a second marginal region in the releasably adhered portion of the laminate that defines the releasable perimeter; and
   f) the first marginal region being releasably adhered to the second marginal region so that the flap may be repeatedly opened to allow access to the products housed within the resealable packaging structure by releasing the first and second marginal regions and repeatedly closed to prevent access to and exposure of the products by sealing the first and second marginal regions.

2. The resealable packaging structure of claim 1 wherein the inner layer opening portion of the flap has dimensions equal to the dimensions of the second laminate opening.

3. The resealable packaging structure of claim 1 wherein the outer layer opening portion of the flap has dimensions greater than the dimensions of the second laminate opening.

4. The resealable packaging structure of claim 3 wherein the tab portion extends beyond the first and second marginal regions.

5. The resealable packaging structure of claim 1 wherein the permanently adhered portion of the laminate comprises a permanent adhesive.

6. The resealable packaging structure of claim 1 wherein the releasably adhered portion comprises a pressure-sensitive adhesive.

7. The resealable packaging structure of claim 1 wherein the inner layer is a coextruded web comprising a barrier layer and a sealant layer.

8. The resealable packaging structure of claim 1 wherein the inner layer comprises a barrier layer and a sealant layer adhesively laminated together.

9. The resealable packaging structure of claim 1 wherein the flap, the inner layer opening portion, and the outer layer opening portion are created by scoring the inner layer and the outer layer.

10. The resealable packaging structure of claim 9 wherein the inner layer is scored only through a portion thereof.

11. The resealable packaging structure of claim 9 wherein the outer layer is scored only through a portion thereof.

12. The resealable packaging structure of claim 1 wherein the flap, the inner layer opening portion, and the outer layer opening portion are created by cutting the laminate.

13. The resealable packaging structure of claim 1 wherein the first marginal region and the second marginal region are in the form of a partial racetrack design.

* * * * *